United States Patent
Mack

(10) Patent No.: US 8,348,004 B2
(45) Date of Patent: Jan. 8, 2013

(54) METHOD FOR GENERATING A TRIGGERING SIGNAL FOR A PEDESTRIAN PROTECTION DEVICE

(75) Inventor: Frank Mack, Seoul (KR)

(73) Assignee: Robert Bosch GmbH, Stuttgart (DE)

( * ) Notice: Subject to any disclaimer, the term of this patent is extended or adjusted under 35 U.S.C. 154(b) by 243 days.

(21) Appl. No.: 11/886,923

(22) PCT Filed: Jan. 31, 2006

(86) PCT No.: PCT/EP2006/050539
§ 371 (c)(1),
(2), (4) Date: Jan. 16, 2009

(87) PCT Pub. No.: WO2006/100146
PCT Pub. Date: Sep. 28, 2006

(65) Prior Publication Data
US 2009/0205896 A1    Aug. 20, 2009

(30) Foreign Application Priority Data
Mar. 24, 2005   (DE) .......................... 10 2005 013 594

(51) Int. Cl.
*B60R 21/34* (2011.01)
(52) U.S. Cl. ........... 180/282; 180/271; 180/274; 701/46
(58) Field of Classification Search .................. 180/271, 180/274, 282; 280/735; 701/45, 46, 47
See application file for complete search history.

(56) References Cited

U.S. PATENT DOCUMENTS
2002/0134607 A1 * 9/2002 Recknagel ................. 180/274
2003/0105569 A1 * 6/2003 Roelleke ......................... 701/45
2004/0084883 A1 * 5/2004 Gioutsos et al. ............... 280/739
2005/0096816 A1 * 5/2005 Takafuji et al. ................. 701/45

FOREIGN PATENT DOCUMENTS

| | | |
|---|---|---|
| DE | 10100880 | 7/2002 |
| DE | 10205351 | 9/2003 |
| DE | 10256950 | 6/2004 |
| DE | 10327115 | 11/2004 |
| DE | 10354035 | 6/2005 |
| EP | 1691213 | 8/2006 |
| JP | 10-194158 | 7/1998 |
| JP | 11-28994 | 2/1999 |
| JP | 11-310095 | 11/1999 |
| JP | 2000-19055 | 1/2000 |
| JP | 2001-277996 | 10/2001 |
| JP | 2002-274318 | 9/2002 |
| JP | 2004-58794 | 2/2004 |
| JP | 2004-196239 | 7/2004 |
| JP | 2004-317247 | 11/2004 |
| JP | 2004-345545 | 12/2004 |
| JP | 2005-156528 | 6/2005 |
| WO | WO 2006/074672 | 7/2006 |

* cited by examiner

*Primary Examiner* — Paul N Dickson
*Assistant Examiner* — Barry Gooden, Jr.
(74) *Attorney, Agent, or Firm* — Kenyon & Kenyon LLP

(57) ABSTRACT

A method for generating a triggering signal for a pedestrian protection device in which sensor data are ascertained and analyzed. After a collision with an object has been recognized, features are generated from the sensor data, which are analyzed for ascertaining an object mass and/or an object hardness, the triggering signal for the pedestrian protection device being generated if the ascertained object mass and/or the ascertained object hardness is/are within a triggering range which represents a collision with a pedestrian.

23 Claims, 4 Drawing Sheets

METHOD FOR GENERATING A TRIGGERING SIGNAL FOR A PEDESTRIAN PROTECTION DEVICE

FIELD OF THE INVENTION

The present invention is directed to a device for generating a triggering signal for a pedestrian protection device.

BACKGROUND INFORMATION

Due to the announcement of the introduction of an EU law for reducing injuries to a pedestrian in the event of a collision between a pedestrian and a vehicle, new vehicles must be designed in such a way that the injuries to the pedestrian in a collision remain within the limits required by this EU law.

A first strategy for reducing injuries to pedestrians aims at creating a crumple zone for the pedestrian via modifications in the bumper and the vehicle design to thus reduce the risk of injury via a passive approach.

A second strategy attempts to recognize the impact of a pedestrian using a suitable sensor system and by subsequently activating a pedestrian protection device such as, for example, an external airbag on the A columns and/or by creating the required crumple zone by lifting the engine hood. The most diverse sensor principles may be used in the active approach, such as acceleration sensors, pressure sensors, knock sensors, piezoelectric and/or optical sensors, etc. The sensors may be situated on a grille support or on a bumper.

A method and a device which, based on the input signals, which may be acceleration signals, make a triggering decision for a pedestrian protection arrangement from the related art, the device including a feature extraction block and a decision logic.

SUMMARY OF THE INVENTION

The method according to the present invention for generating a triggering signal for a pedestrian protection device having the features of independent claim 1 has the advantage over the related art that, after a collision with an object has been recognized, features are generated from the detected sensor data, which are analyzed for ascertaining an object mass and/or an object hardness, whereby a more reliable and more robust triggering of a pedestrian protection device is made possible. The triggering signal for the pedestrian protection device is advantageously generated only if the ascertained object mass and/or the ascertained object hardness are within a triggering range which represents a collision with a pedestrian. The method according to the present invention thus advantageously decides, based on the available sensor signals, whether a collision with a pedestrian is taking place in the present impact situation and whether activation of the pedestrian protection device is necessary or whether it is a different impact situation in which triggering of the pedestrian protection arrangement is undesirable, such as, for example, in the event of a collision with a sign post or with another vehicle.

The classification of objects by their mass, i.e., by a mass that is effective in a collision, and their rigidity makes reliable and robust triggering of the pedestrian protection arrangement possible. Optimum pedestrian protection is thus ensured while minimizing the costs which might occur due to unintentional triggering of the pedestrian protection device, for example, in the event of collisions with other objects. In addition, irritation to the driver by triggering, for example, by lifting of the engine hood, and impairment of the driver's steering behavior is prevented.

The measures and refinements recited in the dependent claims make advantageous improvements on the method for generating a triggering signal for a pedestrian protection device described in independent claim 1 possible.

It is advantageous in particular that the sensor data include acceleration information, which is made available, for example, by a single acceleration sensor or by multiple acceleration sensors. The method may be used in a similar form for other sensor types such as, for example, knock sensors.

It is advantageous in particular that a first integral is calculated from the acceleration information (a), which corresponds to a change in velocity (dv), for ascertaining the object mass ($m_o$). The object mass ($m_o$) is then determined, for example, via a simple model system based on the law of conservation of momentum; the object mass ($m_o$) may be calculated for a known mass ($m_F$) of a vehicle front and for a known velocity ($v_0$) of the vehicle before the collision according to the equation $m_o = -m_F * dv/(v_0+dv)$.

Due to the fact that the front structure of the vehicle usually vibrates after an impact and that harder objects result in higher-frequency vibrations of the front structure, a period of the acceleration information may be advantageously analyzed for ascertaining the object hardness; a frequency corresponding to the object hardness may be determined from the period.

The ascertained object mass may advantageously be taken into consideration for analyzing and determining the period of the acceleration information, whereby the accuracy in determining the period may be improved.

The object hardness may be advantageously derived from a vibration energy which is calculated, for example, by integrating a square of the acceleration information, the calculated vibration energy being a measure of the object hardness and the vibration energy being the greater the higher the frequency of the vibrations.

Additionally or alternatively, the object hardness may be advantageously ascertained from an integral of the absolute values of the acceleration information, the calculated integral being a measure of the object hardness and the integral being the greater the higher the frequency of the vibrations.

The determination of the object hardness may be advantageously improved by taking the ascertained object mass into account for determining the object hardness.

It is advantageous in particular that the sensor data of multiple sensors are averaged with or without weighting for generating features. The features may be weighted, for example, using the information about an impact point, for example, by assigning the highest weight to the features of the sensor closest to the impact point.

It is furthermore possible to determine the limits of the triggering range as a function of time and/or the impact point and/or the velocity and/or the temperature, whereby the object classification, i.e., pedestrian recognition, may be further improved.

Further improvement of the object classification results if the limits of the triggering range of the mass-dependent features are established as a function of the rigidity-dependent features and/or if the limits of the triggering range of the rigidity-dependent features are established as a function of the mass-dependent features.

An exemplary embodiment of the present invention is depicted in the drawings and elucidated in detail in the description that follows.

DETAILED DESCRIPTION

Figure 1:
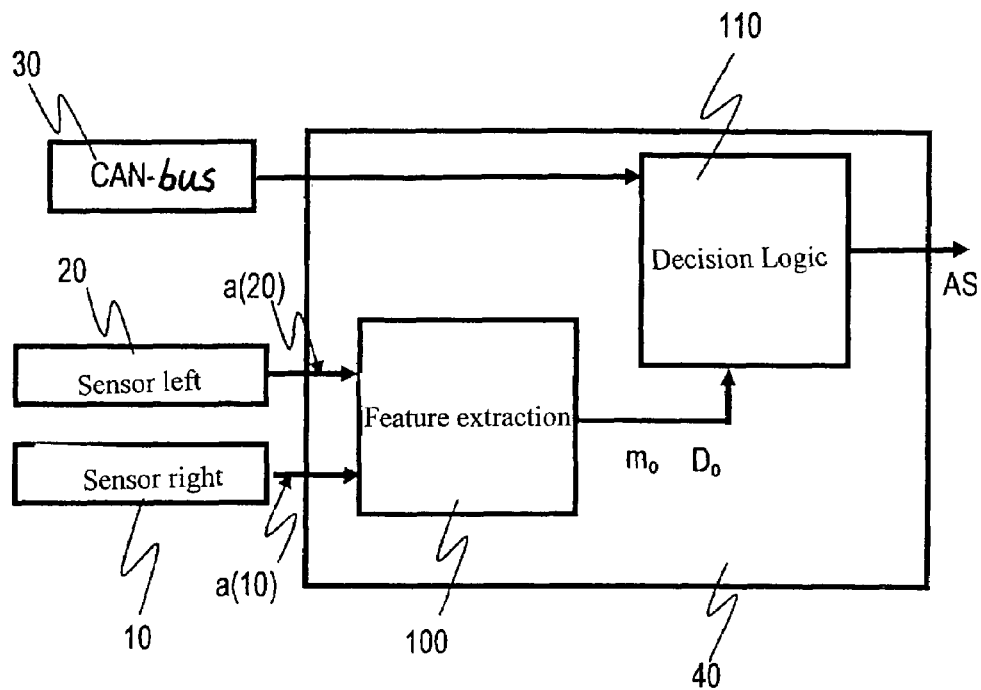
FIG. 1 shows a block diagram of a device for carrying out the method according to the present invention.

As is apparent from FIG. 1, the illustrated exemplary embodiment includes a device for carrying out a method for generating a triggering signal AS for a pedestrian protection device (not illustrated), an analyzing and control unit 40 and two sensors 10, 20, which in the depicted exemplary embodiment are designed as acceleration sensors built into the bumper. On account of the installation in the bumper, a particularly reliable distinction may be made between pedestrian collisions and travel on bumpy roads or over curbs or potholes. The method according to the present invention may also be carried out using other sensors such as, for example, knock sensors. In addition, the device may be extended to more than two sensors.

As is further apparent from FIG. 1, analyzing and control unit 40 includes a feature extraction block 100 and a decision logic 110. Feature extraction block 100 generates features from sensor data a(10), a(20) of sensors 10, 20 which are analyzed for ascertaining an object mass $m_o$, i.e., a mass that is effective in a collision, and/or an object hardness $D_o$. Decision logic 110 generates triggering signal AS for the pedestrian protection device if the ascertained object mass m and/or the ascertained object hardness $D_o$ are within a triggering range AB which represents a collision with a pedestrian. In addition, decision logic 110 analyzes signals, for example, a host vehicle velocity $v_0$, which are provided by a CAN bus system 30.

Figure 2:
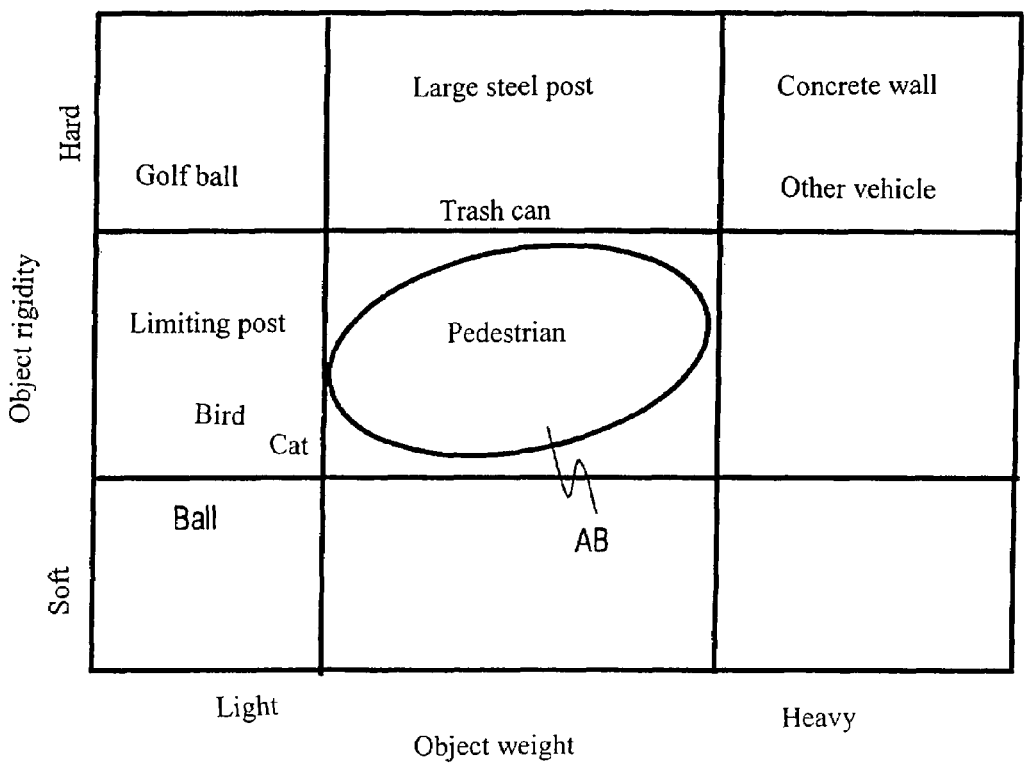
FIG. 2 shows a schematic diagram for classifying objects by object weight and object hardness.

The method according to the present invention is based on the observation that human beings differ mainly by their mass and hardness or rigidity from many other objects for which no triggering of the pedestrian protection arrangement is desired. FIG. 2 shows a schematic diagram for classifying objects by object weight and object hardness. The method according to the present invention generates from sensor data, which may be from acceleration information, features allowing conclusions to be drawn about object mass $m_o$ and/or object hardness $D_o$. After they have been generated, a check is made of whether these features representing object mass $m_o$ and/or object hardness $D_o$ are in a mass and hardness range typical for a human being. If the object in question is too light or too heavy or too hard or too soft, no triggering takes place.

The first integral of acceleration a, which corresponds to a change in velocity dv, is, for example, a feature allowing a conclusion to be drawn about object mass $m_o$. Object mass $m_o$ is then determined, for example, via a simple model system based on the law of conservation of momentum. The object having mass $m_o$ is at rest before the impact or collision, and the vehicle front having mass $m_F$ moves with velocity $v_0$. After the collision or impact, the object and the vehicle front move with velocity $v_1 = v_0 + dv$, where velocity dv assumes negative values. Equation (1) follows from the conservation of momentum.

$$(m_o+m_F)*(v_0+dv)=m_F*v_0 \quad (1)$$

Equation (2) for calculating object mass $m_o$ is obtained by transforming equation (1).

$$m_o=-m_F*dv/(v_0+dv) \quad (2)$$

Since mass $m_F$ of the vehicle front is known and $v_0$ may be estimated with the aid of the velocity provided via the CAN bus system, change in velocity dv provides a mass-dependent feature which allows object mass mo to be estimated.

Since the front structure of the vehicle and thus the bumper vibrate after the impact, it is advantageous in particular to analyze the minimum of the negative change in velocity dv in a first time range, typically 10 ms, after a collision with an object has been recognized. The collision with an object is recognized, for example, by the absolute value of the acceleration signal reaching and/or exceeding a predefined threshold value. Additionally or alternatively other features correlating with the mass may also be used.

In a system having multiple sensors 10, 20, the corresponding associated features are generated from sensor data a(10), a(20), and a shared feature is generated from the features of individual sensors 10, 20, for example, by averaging with or without weighting. The features may be weighted, for example, by using the information about an impact point, for example, by assigning the highest weight to the features of the sensor closest to the impact point.

Figure 3:
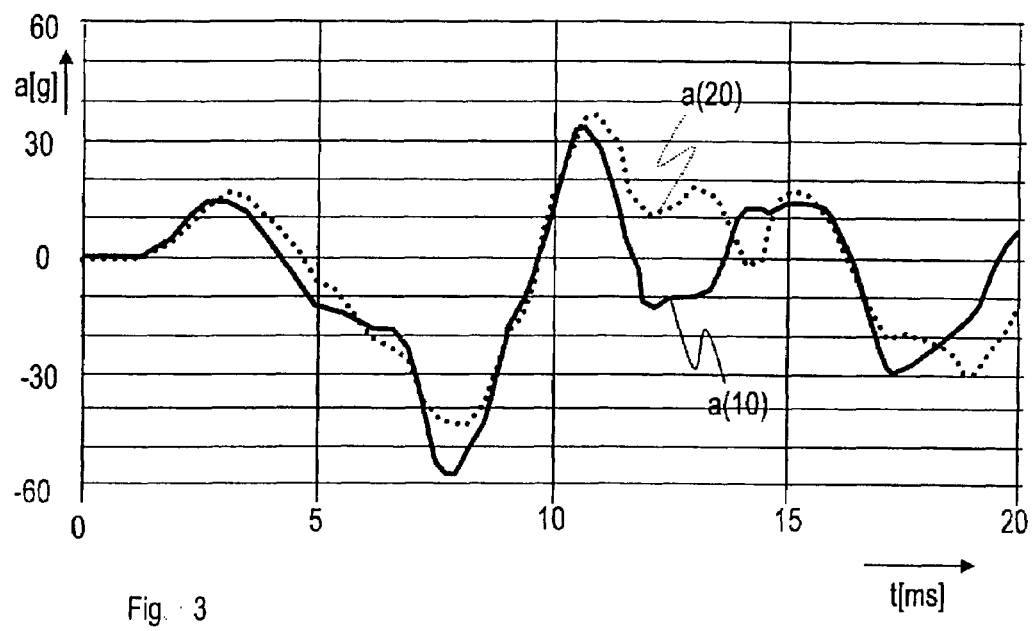
FIG. 3 shows a schematic diagram for representing acceleration signals in the event of a collision with a legform impactor simulating a pedestrian.
Figure 4:
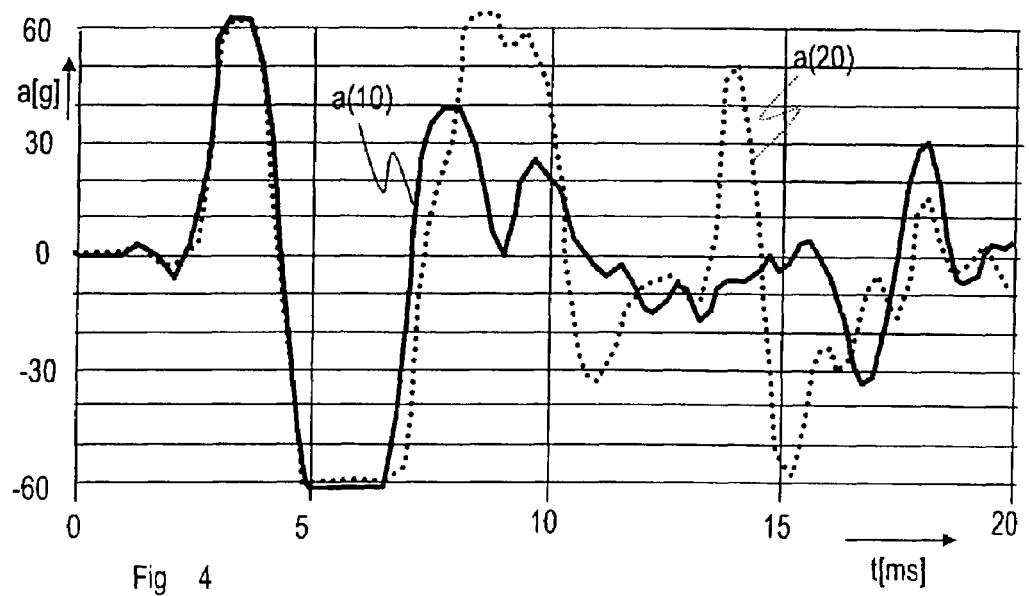
FIG. 4 shows a schematic diagram for representing acceleration signals in the event of a collision with a very hard object.

The features which allow conclusions to be drawn about object rigidity $D_o$ are based on the observation that harder objects result in higher-frequency vibrations of the bumper, for example. FIG. 3 shows a schematic diagram which represents acceleration signal a(10) detected by first acceleration sensor 10 and acceleration signal a(20) detected by second acceleration sensor in a collision with a legform impactor simulating a pedestrian, and FIG. 4 shows a schematic diagram of acceleration signals a(10) and a(20) in a collision with a very hard object, for example, a steel pipe. As is apparent from a comparison of FIGS. 3 and 4, the harder steel pipe having the same mass generates considerably higher-frequency vibrations than a pedestrian which is simulated by the legform impactor. This may be explained by the fact that frequency ω of the vibration of a mass attached to a spring is proportional to the square root of rigidity D. This relationship is represented in equation (3).

$$\omega = \sqrt{\frac{D}{M}} \quad (3)$$

To estimate the frequency, the period of acceleration signals a(10) and a(20) may be analyzed. To determine and analyze the period of acceleration signals a(10) and a(20) the ascertained object mass m. may additionally be used, whereby the accuracy in determining the period may be improved.

Figure 5:
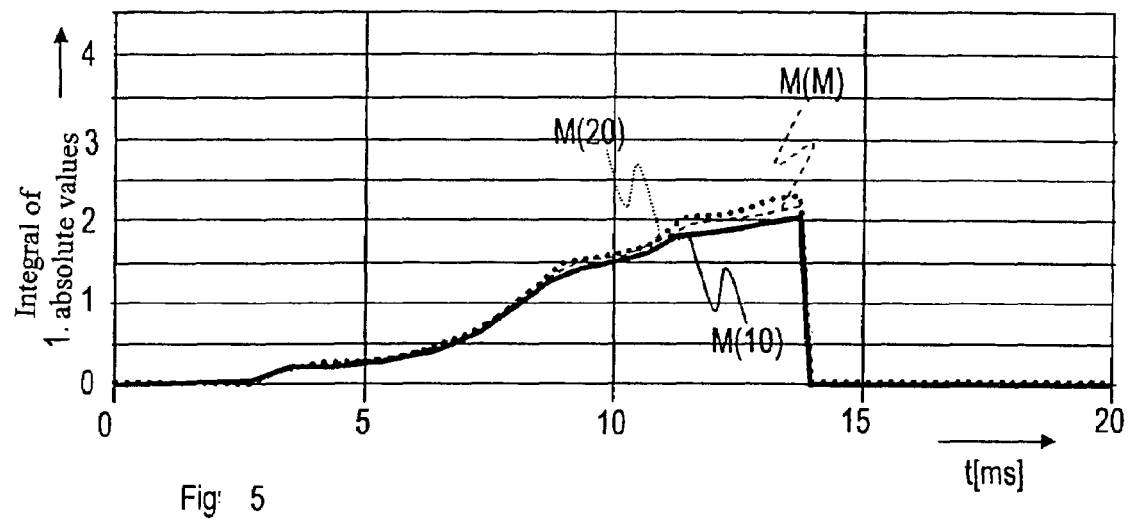
FIG. 5 shows a schematic diagram for representing integrals of the absolute values of the acceleration signal in the event of a collision with a legform impactor simulating a pedestrian.
Figure 6:
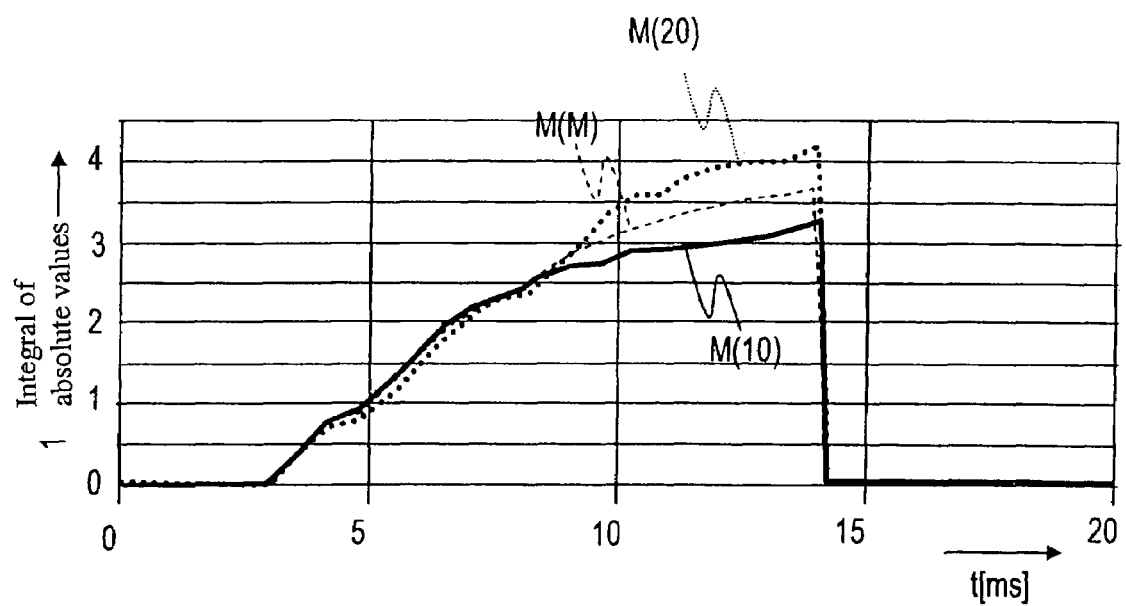
FIG. 6 shows a schematic diagram for representing integrals of the absolute values of the acceleration signal in the event of a collision with a very hard object.

Additionally or alternatively, to estimate object rigidity Do, the vibration energy may be ascertained by integrating the square of acceleration information a(10), a(20). Another possibility for estimating the object rigidity is to integrate the absolute values of acceleration information a(10), a(20). For objects having the same object mass $m_o$, the calculated value of the integral is the higher the higher the frequency of the vibrations of acceleration information a(10), a(20), i.e., the harder the corresponding object. FIG. 5 shows a schematic diagram which represents the first integral of absolute value M(10) of acceleration signal a(10) detected by first acceleration sensor 10 and the first integral of absolute value M(20) of acceleration signal a(20) detected by second acceleration sensor 20 in a collision with a legform impactor simulating a pedestrian, and FIG. 6 shows a schematic diagram of the first integral of absolute value M(10) of acceleration signal a(10) and the first integral of absolute value M(20) of acceleration signal a(20) in a collision with a very hard object, for example, a steel pipe. In addition, the averaged first integral of absolute value M(M) of both first integrals of absolute values M(10) and M(20) is shown. As is apparent from a comparison of FIGS. 5 and 6, the harder steel pipe having the same mass generates greater first integrals of absolute values M(10), M(20), M(M) due to the higher-frequency vibrations than a pedestrian which is simulated by the legform impactor.

Object rigidity $D_o$ may also be estimated, for example, via a combination of multiple rigidity-dependent features. In addition, ascertained object mass $m_o$ may be used for the above-described different options for estimating object rigidity $D_o$, whereby the accuracy of estimation of the object rigidity may be improved. As explained above, in a system having multiple sensors 10, 20 rigidity-dependent features M(10), M(20) of individual sensors 10, 20 are averaged with or without weighting to yield one feature M(M). In addition, the estimate of object mass mo may be retroactively improved by taking into account features M(10), M(20), M(M), which are used for estimating rigidity.

In a simple specific embodiment of the method according to the present invention for classifying the objects, the mass-dependent features, for example, dv, at a certain point in time are compared with upper and lower limits to classify the objects after an object impact has been recognized. If the mass-dependent features are outside these limits, it is recognized that the object, for example, a sign post, is too light or, in the case of another vehicle, too heavy to be a human being. Triggering of the pedestrian protection arrangement is thus suppressed or prevented. However, if the mass-dependent feature is between these limits, triggering is enabled. A similar procedure is used with the rigidity-dependent features.

Figure 7:
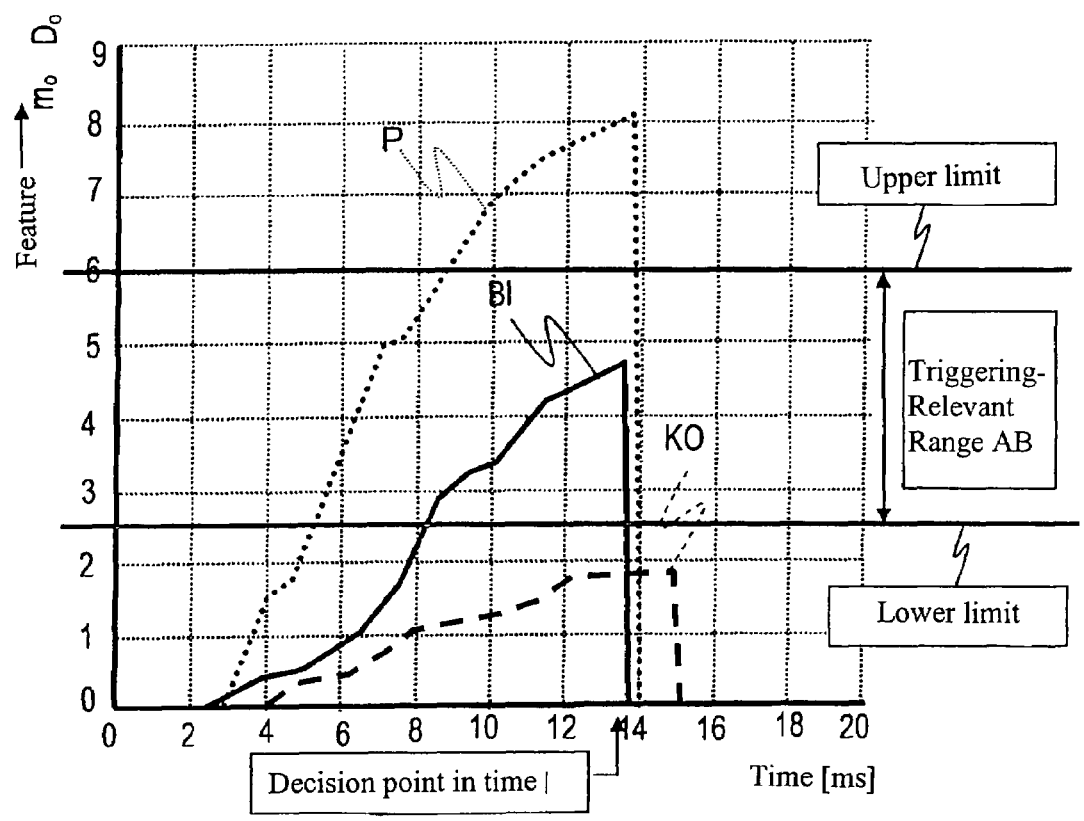
FIG. 7 shows a schematic diagram for representing different curves of a feature for various objects impacting the vehicle front in the center at 20 km/h.

FIG. 7 shows feature characteristic curves P, BI, KO of three different objects which impact the vehicle front centrally at a predefined velocity, for example, 20 km/h. A dotted feature characteristic curve P represents a steel post; solid characteristic curve BI represents a legform impactor simulating a pedestrian, and dashed characteristic curve KO represents a small, light object. The upper and lower limits shown result, for example, from the boundary conditions host vehicle velocity and impact point on the vehicle.

As is apparent from FIG. 7, at the time of the decision only characteristic curve BI is within the upper and lower limits, so that decision logic 110 generates triggering signal AS only for this case. Characteristic curve P is above the upper limit and characteristic curve KO is below the lower limit, so that decision logic 110 makes a negative triggering decision, i.e., the decision logic generates no triggering signal AS and the pedestrian protection device is not activated. The upper and lower limits shown may be variable and may be set as a function of the velocity provided by the CAN bus system and/or of the recognized impact point and/or of the temperature. Since the characteristics of the vehicle front are more or less dependent on the temperature based on the materials used, the temperature information, which may be provided by a temperature sensor, for example, may also be used in calculating the different features. Additionally or alternatively to the recognition of the predefined point in time, time-dependent upper and lower limits may also be used. In an advantageous extension of the method according to the present invention, the limits for the rigidity-dependent features may be set as a function of the mass-dependent features and/or the limits of the mass-dependent features may be set as a function of the rigidity-dependent features.

In an alternative specific embodiment (not illustrated) of the method according to the present invention, a two-dimensional or multidimensional feature space may be spanned by mass-dependent and rigidity-dependent features, where triggering is enabled only in certain regions which represent a human being.

What is claimed is:

1. A method for generating a triggering signal for a pedestrian protection device in which sensor data are ascertained and analyzed, the method comprising:
   analyzing the sensor data for ascertaining an object mass and an object hardness; and
   generating, after a collision with an object has been recognized, features from the sensor data, the triggering signal for the pedestrian protection device if the ascertained object mass and the ascertained object hardness are within, a triggering range which represents a collision with a pedestrian,
   wherein the sensor data include acceleration information,
   wherein the object hardness is ascertained by determining a frequency from a period of the acceleration information; and,
   wherein the object hardness is derived from an integral of the absolute values of the acceleration information, the calculated integral being a measure of the object hardness and the integral being greater for higher frequencies of the vibrations.

2. The method of claim 1, wherein, to ascertain the object mass, a first integral is calculated, which corresponds to a change in velocity, the object mass being ascertained for a known mass of a vehicle front and for a known velocity before the collision according to the equation $m_o = -m_F * dv/(v_0 + dv)$.

3. The method of claim 1, wherein the ascertained object mass is taken into account in analyzing and determining the period of the acceleration information.

4. The method of claim 1, wherein the ascertained object mass is taken into account in ascertaining the object hardness.

5. The method of claim 1, wherein the sensor data of multiple sensors are averaged with or without weighting for generating features.

6. The method of claim 1, wherein the limits of the triggering range are determined as a function of at least one of time of impact, point of impact, velocity, and temperature.

7. The method of claim 1, wherein the limits for the triggering range of the mass-dependent features are established as a function of the rigidity-dependent features, and the limits for the triggering range of the rigidity-dependent features are established as a function of the mass-dependent features.

8. The method of claim 1, wherein, to ascertain the object mass, a first integral is calculated, which corresponds to a change in velocity, the object mass being ascertained for a known mass of a vehicle front and for a known velocity before the collision according to the equation $m_o = -m_F * dv/(v_0 + dv)$, and wherein the ascertained object mass is taken into account in analyzing and determining the period of the acceleration information.

9. The method of claim 8, wherein the ascertained object mass is taken into account in ascertaining the object hardness, wherein the sensor data of multiple sensors are averaged with or without weighting for generating features.

10. The method of claim 8, wherein the limits of the triggering range are determined as a function of at least one of time of impact, point of impact, velocity, and temperature.

11. The method of claim 8, wherein the limits for the triggering range of the mass-dependent features are established as a function of the rigidity-dependent features, and the limits for the triggering range of the rigidity-dependent features are established as a function of the mass-dependent features.

12. A method for generating a triggering signal for a pedestrian protection device in which sensor data are ascertained and analyzed, the method comprising:
    analyzing the sensor data for ascertaining an object mass and an object hardness; and
    generating, after a collision with an object has been recognized, features from the sensor data, the triggering signal for the pedestrian protection device if the ascertained object mass and the ascertained object hardness are within, a triggering range which represents a collision with a pedestrian;
    wherein the sensor data include acceleration information,
    wherein the object hardness is ascertained by determining a frequency from a period of the acceleration information, and
    wherein the object hardness is derived from a vibration energy which is calculated by integrating a square of the acceleration information, the calculated vibration energy being a measure of the object hardness, and the vibration energy being greater for higher frequencies of the vibrations.

13. The method of claim 12, wherein, to ascertain the object mass, a first integral is calculated, which corresponds to a change in velocity, the object mass being ascertained for a known mass of a vehicle front and for a known velocity before the collision according to the equation $m_o = -m_F * dv/(v_0 + dv)$.

14. The method of claim 12, wherein the ascertained object mass is taken into account in analyzing and determining the period of the acceleration information.

15. The method of claim 12, wherein the sensor data of multiple sensors are averaged with or without weighting for generating features.

16. The method of claim 12, wherein the limits of the triggering range are determined as a function of at least one of time of impact, point of impact, velocity, and temperature.

17. The method of claim 12, wherein the limits for the triggering range of the mass-dependent features are established as a function of the rigidity-dependent features, and the limits for the triggering range of the rigidity-dependent features are established as a function of the mass-dependent features.

18. The method of claim 12, wherein, to ascertain the object mass, a first integral is calculated, which corresponds to a change in velocity, the object mass being ascertained for a known mass of a vehicle front and for a known velocity before the collision according to the equation $m_o = -m_F * dv/(v_0 + dv)$, and wherein the ascertained object mass is taken into account in analyzing and determining the period of the acceleration information.

19. A method for generating a triggering signal for a pedestrian protection device in which sensor data are ascertained and analyzed, the method comprising:
    analyzing the sensor data for ascertaining an object mass and an object hardness; and
    generating, after a collision with an object has been recognized, features from the sensor data, the triggering signal for the pedestrian protection device if the ascertained object mass and the ascertained object hardness are within, a triggering range which represents a collision with a pedestrian;
    wherein the sensor data include acceleration information,
    wherein the object hardness is ascertained by determining a frequency from a period of the acceleration information,
    wherein, to ascertain the object mass, a first integral is calculated, which corresponds to a change in velocity, the object mass being ascertained for a known mass of a vehicle front and for a known velocity before the collision according to the equation $m_o = -m_F * dv/(v_0 + dv)$, and wherein the ascertained object mass is taken into account in analyzing and determining the period of the acceleration information, and
    wherein the object hardness is derived from a vibration energy which is calculated by integrating a square of the acceleration information, the calculated vibration energy being a measure of the object hardness, and the vibration energy being greater for higher frequencies of the vibrations.

20. The method of claim 19, wherein the ascertained object mass is taken into account in analyzing and determining the period of the acceleration information.

21. The method of claim 19, wherein the sensor data of multiple sensors are averaged with or without weighting for generating features.

22. The method of claim 19, wherein the limits of the triggering range are determined as a function of at least one of time of impact, point of impact, velocity, and temperature.

23. The method of claim 19, wherein the limits for the triggering range of the mass-dependent features are established as a function of the rigidity-dependent features, and the limits for the triggering range of the rigidity-dependent features are established as a function of the mass-dependent features.

* * * * *